(12) United States Patent
Lovinggood et al.

(10) Patent No.: US 6,445,904 B1
(45) Date of Patent: Sep. 3, 2002

(54) REPEATER DIVERSITY SYSTEM

(75) Inventors: Breck W. Lovinggood, Garland; William P. Kuiper, Lucas, both of TX (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 09/506,245

(22) Filed: Feb. 17, 2000

(51) Int. Cl.[7] .............................................. H04B 3/36
(52) U.S. Cl. .......................... 455/7; 455/11.1; 455/273; 455/276.1; 455/562
(58) Field of Search ............................. 455/7, 11.1, 15, 455/273, 276.1, 10, 65, 504, 561, 562

(56) References Cited

U.S. PATENT DOCUMENTS

| | | | |
|---|---|---|---|
| 5,280,472 A | | 1/1994 | Gilhousen et al. ............ 370/18 |
| 5,345,600 A | * | 9/1994 | Davidson .................... 455/504 |
| 5,513,176 A | | 4/1996 | Dean et al. .................... 370/18 |
| 5,548,837 A | * | 8/1996 | Hess et al. ................ 455/276.1 |
| 5,930,293 A | * | 7/1999 | Light et al. .............. 455/276.1 |
| 6,125,109 A | * | 9/2000 | Fuerter ...................... 455/11.1 |
| 6,188,873 B1 | * | 2/2001 | Wickman et al. .......... 455/11.1 |

* cited by examiner

*Primary Examiner*—Nay Maung
*Assistant Examiner*—Quochien B. Vuong
(74) *Attorney, Agent, or Firm*—Wood, Herron & Evans, L.L.P.

(57) ABSTRACT

A repeater diversity system includes a null antenna having a given phase center and polarization for receiving a communications signal from a remote signal source, a donor antenna for transmitting a signal to a base station, and a diversity null antenna having the same phase center as the receive null antenna and a polarization orthogonal to the polarization of the main null antenna. A combining network is coupled to the main null antenna and the diversity null antenna for combining the signals therefrom and an uplink channel module is coupled with the combining network for delivering diversity combined receive signals to the donor antenna.

19 Claims, 3 Drawing Sheets

REPEATER DIVERSITY SYSTEM

BACKGROUND OF THE INVENTION

The present invention relates to communications systems, and more particularly to a repeater for use in a wireless communications system. The invention concerns the provision of polarization diversity and pre-detection equal gain combining to reduce the deleterious effects of multipath on the receive performance of a repeater in a wireless communications system.

Diversity has been used and/or proposed for use in radio communications systems in a number of forms. Generally speaking, the term diversity refers to a method of signal extraction by which an optimum resultant signal is derived from a combination of, or selection from, a plurality of transmission paths, channels, techniques or physical arrangements. A number of types of diversity are generally known in radio frequency communications systems, including space diversity, polarization diversity, frequency diversity and time diversity. Each of these represents an arrangement by which a choice can be made between signals.

Prior U.S. Pat. Nos. 5,280,472 and 5,513,176 respectively describe a CDMA micro-cellular telephone system and distributed antenna system therefor, and a dual distributed antenna system, which use a time-delay type of diversity, in which delay is used in one path to improve multi-path performance in distributed antenna systems. These patents also generally describe a number of other CDMA (code division multiple access) techniques for cellular mobile systems, as well as briefly describing some of the other types of diversity mentioned above.

However, heretofore, polarization diversity and pre-detection, equal gain combining have not been proposed for improving the receive performance of a repeater in a wireless communications system.

In radio receivers, diversity combining, that is, combining of the two or more signals selected for the diversity reception, can be implemented either before or after detection of the received communications signal. However, in the case of a repeater, no detection is used, since a repeater merely "boosts" the signal from the remote users and retransmits it to a base station. Therefore, no modulation or demodulation takes place in a repeater. Thus, the present invention recognizes that pre-detection techniques can advantageously be employed in a repeater.

The usual approach to receiving two diversity path signals is to use two separate antenna elements that are spatially separated. These two separated antennas provide two versions of the desired receive signals with statistically independent multipath characteristics. The statistical independence of the multipath in each received signal is the basis for multipath improvement in a diversity combining system.

However, equal gain combining of the diversity signals is complicated by the problem of aligning the phase of the two diversity paths, since the relative phase of the desired signals is dependent on the location of the signal source with respect to the two diversity receive antennas. This problem can be further complicated when the signal source is a mobile source, since the phase variation is no longer constant or stationary.

OBJECTS AND SUMMARY OF THE INVENTION

Accordingly, is a general object of the invention to use polarization diversity and equal gain combining to improve the receive performance of a repeater in a wireless communication system, while overcoming the above-noted problems.

We have recognized that the above-stated problem of equal gain combining with a mobile signal source may be overcome by the use of polarization diversity in a repeater. It is well documented that the vertical and horizontal field components in a communications link are highly uncorrelated. We have found that by using receive antennas that have the same phase center and orthogonal polarizations, the problem of location-induced phase variation is eliminated. Therefore, we can use an equal gain combiner which utilizes a fixed phase adjustment that is dependent only on the fixed phase differences of the repeater equipment, and not upon the changing location of the mobile signal source.

Briefly, and in accordance with the foregoing, a repeater diversity system comprises a main null antenna having a given phase center and polarization for receiving a communications signal from a remote signal source; a donor antenna for transmitting a signal to a base station; a diversity null antenna having the same phase center as the main null antenna and a polarization orthogonal to the polarization of the main null antenna; a combining network coupled to the main null antenna and the diversity null antenna for combining the signals therefrom; and an uplink channel module coupled with said combining network for delivering diversity combined receive signals to said donor antenna.

DETAILED DESCRIPTION OF THE ILLUSTRATED EMBODIMENT

Figure 1:
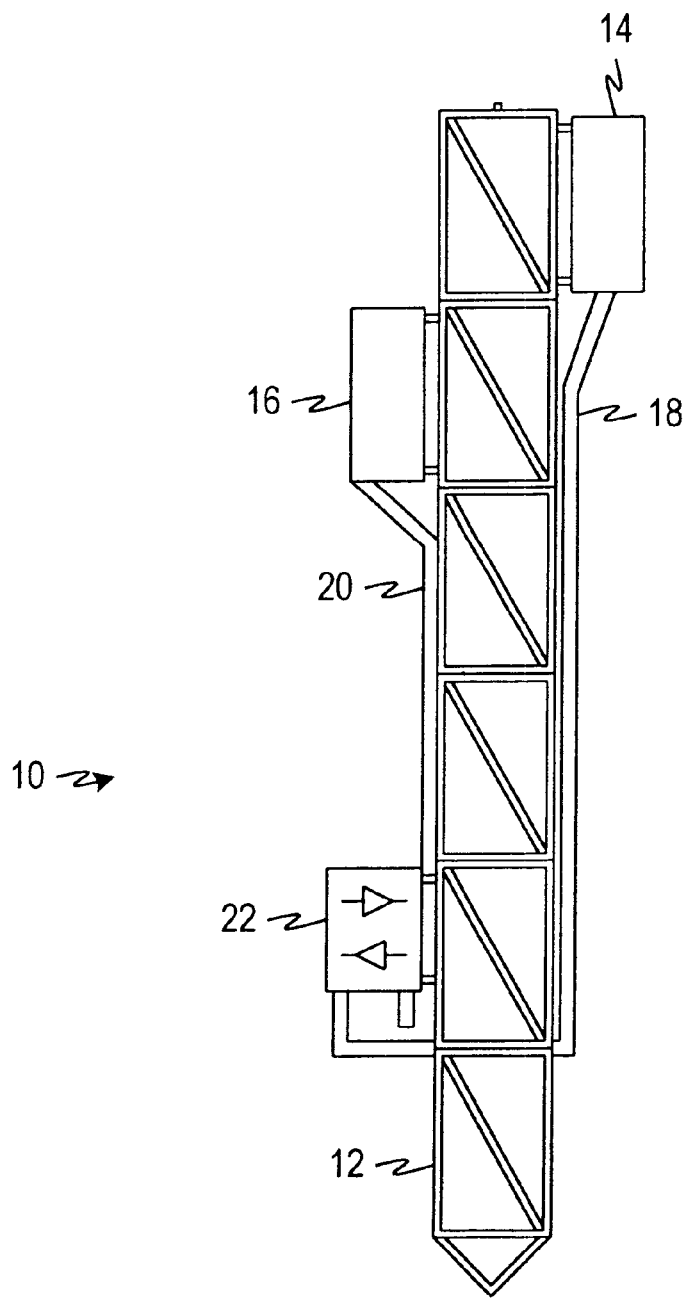
FIG. 1 is a simplified elevation showing a repeater tower structure in accordance with one embodiment of the invention.

Referring now to the drawings, and initially to FIG. 1, a repeater diversity system in accordance with the invention is employed in a repeater system 10 mounted to a tower 12. At the top end of the tower 12, a null antenna 14 and a donor antenna 16 are mounted facing in generally opposite directions. Appropriate feeds such as coaxial cables or other suitable feedlines 18 and 20 respectively run from the null antenna 14 and donor antenna 16 to an electronics enclosure 22 located at a lower part of the tower 12, in which the repeater-associated electronic circuitry is located, which circuitry will be further described in connection with FIG. 2.

The null antenna generally broadcasts and receives signals relative to a remote user location or subscriber equipment. This subscriber equipment may be mobile equipment such as in a cellular or PCS system, or the like. Thus, the signal source received by the null antenna from the remote equipment may be a mobile signal source.

The donor antenna 16 transmits and receives signals relative to a base station at some remote location. The repeater electronics 22, among other things, boosts the signals as they are passed between the null antenna and the donor antenna, to enhance the communications between the remote source and the base station.

Figure 2:
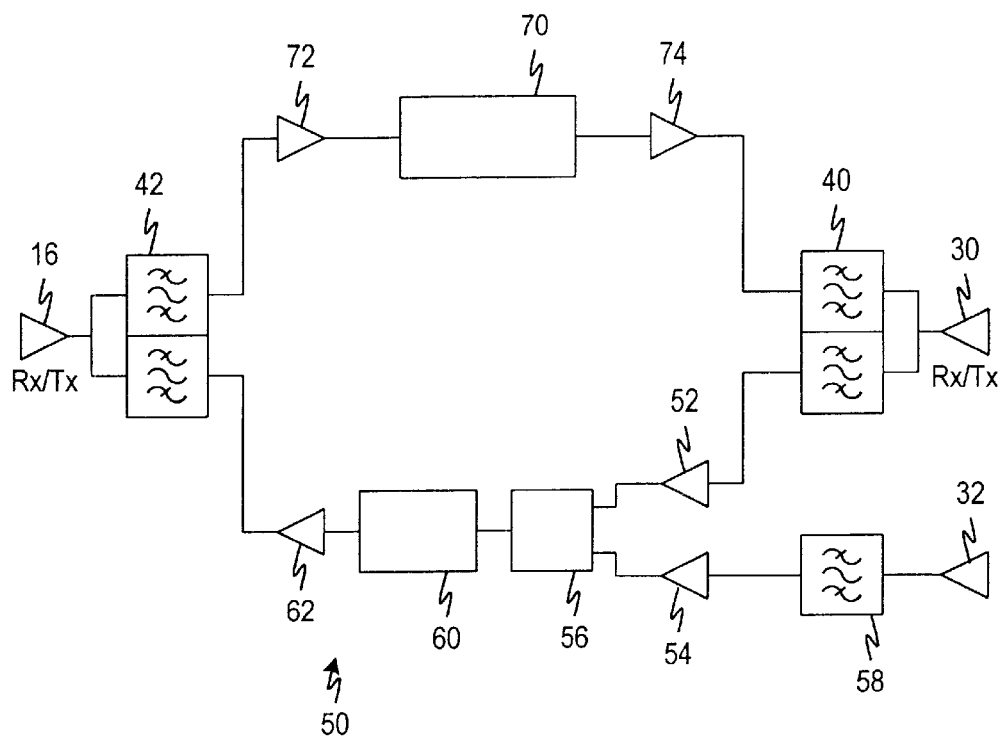
FIG. 2 is a circuit schematic illustrating a diversity repeater system in accordance with one embodiment of the invention.
Figure 4:
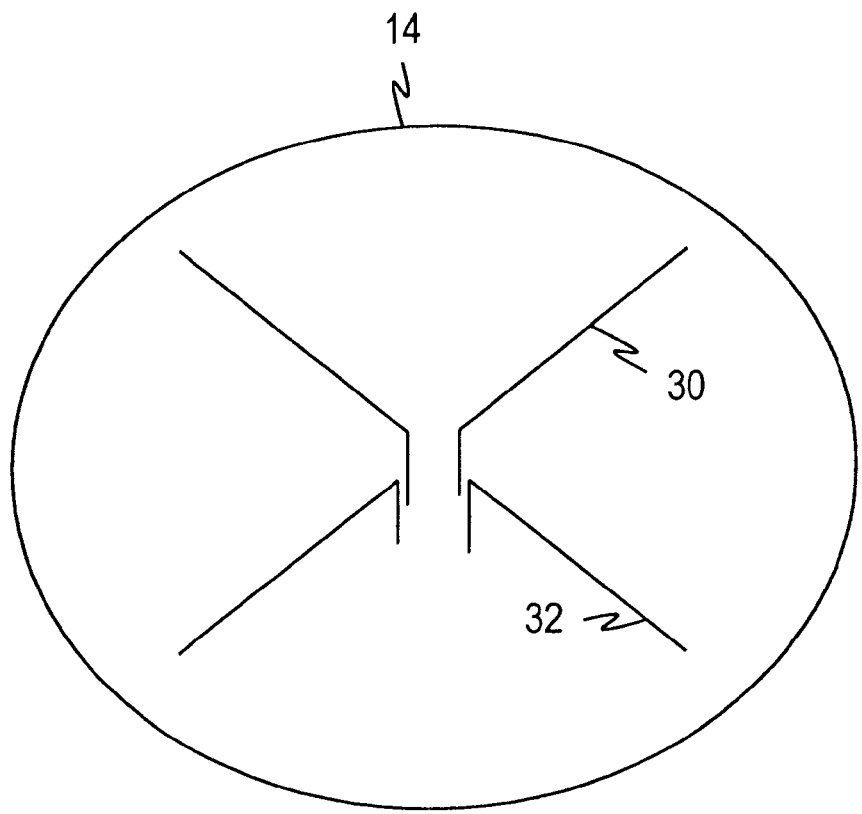
FIG. 4 is a simplified showing of two antennas having the same phase center and mutually orthogonal polarizations.

Referring to FIG. 2, in accordance with a feature of the invention, the null antenna 14 includes a main null antenna 30 and a receive (Rx) diversity null antenna 32. In one embodiment of the invention, these two antennas 30 and 32 are arranged to have the same phase center but mutually orthogonal polarizations (see FIG. 4). As mentioned above, by using this arrangement, the problem of location-induced phase variation is substantially eliminated. This fact can be used to overcome the complications in differential phase variation of the main and diversity signals of a mobile signal source, when the signal source is moving over time relative to the repeater location.

In the illustrated embodiment, the main null antenna 30 and the donor antenna 16 serve to both transmit and receive signals relative to the remote or subscriber equipment and the base station, respectively. Accordingly, each of these antennas is provided with a frequency diplexer 40, 42 to accommodate the use of different frequency bands in the uplink and downlink channels.

Referring first to the uplink channel 50, it will be seen that the receive signals from the main and Rx diversity null antennas 30, 32 are fed through respective low noise amplifier (LNA)/attenuator circuits 52, 54 and combined at a combining network 56. In one embodiment the combining network combines these signals with a fixed phase adjustment. The incoming signal from the Rx diversity null antenna 32 is initially processed by a suitable filter 58. The combined signal from the combining network 56 is further processed by an uplink channel module 60, amplified by a power amplifier 62, and fed to the donor antenna 16 via its associated diplexer 42. In accordance with one embodiment of the invention, the signals from the main and Rx diversity null antennas are combined at the combining network 56 with equal gain from the low noise amplifiers 52, 54. In the illustrated embodiment, the signals from the antennas 30 and 32 are aligned in phase by the combining network 56 and uplink channel module 60, in addition to being combined with equal gain settings on each path.

Completing the electronics 22, a downlink channel module 70 receives signals transmitted from the base station via the donor antenna 16 and its associated frequency diplexer 42, which signals are first amplified by a low noise amplifier (LNA)/attenuator 72. The output of the down link channel module 70 is fed through a power amplifier 74 to the diplexer 40 for transmission by the main null antenna 30.

Typically, each channel module includes an upconverter, a filter, and a downconverter. Some gain may also be provided. Suitable channel modules are made by Andrew Corporation, the assignee.

In the system of the invention as described above, the two null antennas 30 and 32 provide two separate versions of the receive signals from the remote or subscriber equipment with statistically independent multipath characteristics, since the vertical and horizontal field components in a communications link are highly uncorrelated. By using receive antennas 30, 32 that have the same phase center and mutually orthogonal polarizations, differential phase variations induced by the changing location of a mobile lo remote source are substantially eliminated. This overcomes the usual challenge of equal gain combining which requires that the two diversity paths be aligned in phase, since phase alignment would normally be made difficult by the changing location of the mobile signal source.

Advantageously, the invention makes possible the implementation of receive diversity in a repeater being used in a wireless communication system. The implementation of receive diversity in a repeater is not limited to a single type of system (e.g., CDMA) but could be implemented for any digital-or analog-based wireless communications system. The invention provides, on average, a 2.5 to 3 dB increase in the average carrier to noise ratio of the received signal.

Figure 3:
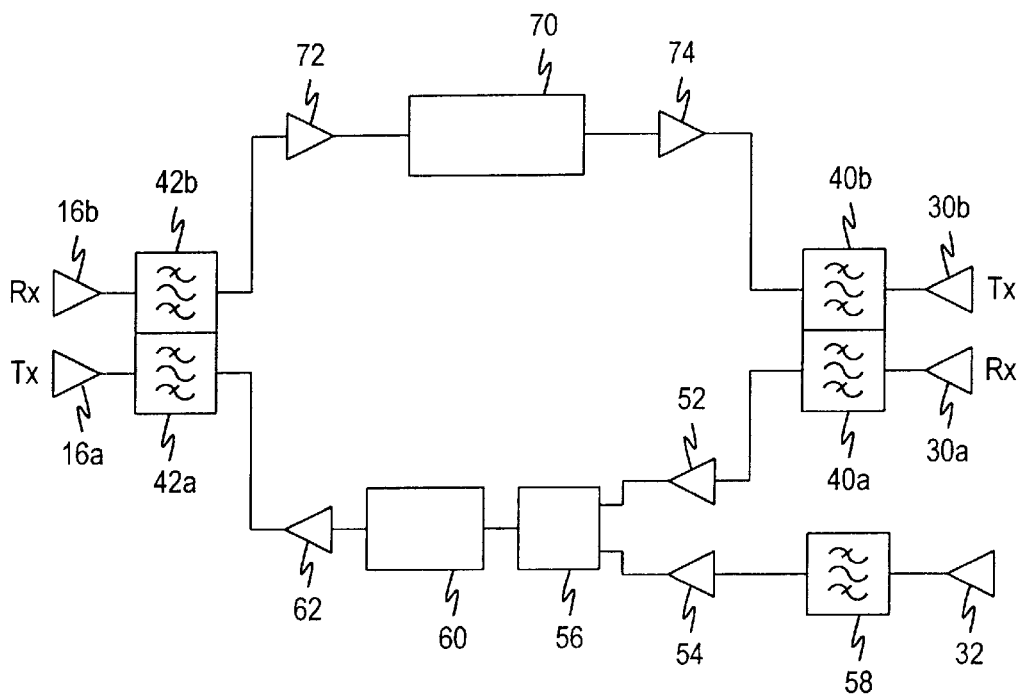
FIG. 3 is a circuit schematic illustrating a diversity repeater system in accordance with a second embodiment of the invention.

Rather than a single main antenna and a signal donor antenna as described above, with frequency diplexers, the repeater may employ separate transmit and receive antennas in both the null and donor antenna capacities, utilizing separate signal paths in amplification therebetween. Such an arrangement is shown in FIG. 3. In this case, the signal from the receive antenna element 30a of the main null antenna would be combined with the signal from the receive diversity null antenna 32 at the combiner 56, after bandpass filtering at filters 40a, 58 and equal gain amplification at LNA's 52, 54.

In the case of separate transmit and receive donor antennas, the LNA 72 would receive the signal from the donor receive antenna 16b which it would transmit through the down link channel module 70, power amplifier 74 and bandpass filter 40b to the transmit main null antenna element 30b. Similarly, the receive main null antenna 30a would deliver the received signal to the LNA 52 (after bandpass filter 40a), which, upon being combined with the Rx diversity null antenna (32) signal at the combining network 56 and processed at the uplink module 60, would be delivered via the power amplifier 62 and transmit bandpass filter 42a to a transmit donor antenna 16a for transmission to the base station.

In one specific example of a CDMA repeater system, the uplink module 60 employs a channelizer having a gain of about 24 dB or greater for an uplink path channel in a frequency range from 1850 to 1910 MHz. Similarly, the downlink module 70 utilizes a channelizer having a gain of at least 24 dB for a downlink path channel in a frequency range of 1930 to 1990 MHz. In this embodiment, the gain of the low noise amplifiers 52 and 54 is 33 dB or greater and the gain of the power amplifiers 62 and 74 is 43 dB or greater.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A repeater diversity system comprising:
    a main null antenna having a given phase center and polarization for receiving a communications signal from a remote signal source;
    a donor antenna for transmitting a signal to a base station;
    a diversity null antenna having the same phase center as the main null antenna and a polarization orthogonal to the polarization of the main null antenna;
    a combining network coupled to the main null antenna and the diversity null antenna for combining received signals therefrom to constitute diversity combined receive signals, the combining network further configured to phase align the received signals; and
    an uplink channel module coupled with said combining network for delivering said diversity combined receive signals to said donor antenna.

2. The system of claim 1 wherein said combining network combines the signals from the main null antenna and the diversity null antenna with a fixed phase adjustment.

3. The system of claim 1 and further including a low noise amplifier coupled intermediate said main null antenna and said combining network and having a predetermined gain, and a second low noise amplifier coupled intermediate said diversity null antenna and said combining network and having the same gain as the first low noise amplifier, such that the signals from the main null antenna and the diversity null antenna are combined at the combining network with equal gain.

4. The system of claim 1 and further including separate transmit and receive main null antenna elements.

5. The system of claim 1 and further including a downlink channel module connecting the donor antenna with the main null antenna.

6. The system of claim 5 and further including a power amplifier coupled intermediate said downlink channel module and said main null antenna.

7. The system of claim 5 and further including a low noise amplifier coupled between said donor antenna and said downlink channel module.

8. The system of claim 1 and further including a frequency diplexer coupled with said main null antenna for processing transmit and receive signals in separate transmit and receive channels.

9. The system of claim 1 and further including a frequency diplexer coupled with said donor antenna for processing transmit and receive signals in separate channels.

10. The system of claim 1 and further including a diversity filter coupled in series with said diversity null antenna and said second low noise amplifier.

11. The system of claim 1 and further including separate transmit and receive donor antenna elements.

12. The system of claim 1 and further including a power amplifier coupled intermediate said uplink channel module and said donor antenna.

13. A repeater diversity method for a repeater having a main null antenna with a given phase center and polarization for receiving a communications signal from a remote signal source and a donor antenna for transmitting a signal to a base station, said method comprising:

provinding a diversity null antenna having the same phase center as the main null antenna and a polarization orthogonal to the polarization of the main null antenna;

combining the signals from the main null antenna and the diversity null antenna with phase alignment to constitute diversity combined receive signals; and delivering the combined signals to said donor antenna.

14. The method of claim 13 wherein said combining includes combining the signals from the main null antenna and the diversity null antenna with a fixed phase adjustment.

15. The method of claim 13 wherein said combining includes combining the signals from the main null antenna and the diversity null antenna with equal gain.

16. A repeater diversity system comprising:

a main null antenna having a given phase center and polarization for receiving a communications signal from a remote signal source;

a donor antenna for transmitting a signal to a base station;

a diversity null antenna having the same phase center as the main null antenna and a polarization orthogonal to the polarization of the main null antenna;

a combining network coupled to the main null antenna and the diversity null antenna for combining received signals therefrom to constitute diversity combined receive signals;

an uplink channel module coupled with said combining network for delivering said diversity combined receive signals to said donor antenna;

a first low noise amplifier coupled intermediate said main null antenna and said combining network and having a predetermined gain; and a second low noise amplifier coupled intermediate said diversity null antenna and said combining network and having the same gain as the first low noise amplifier, such that the signals from the main null antenna and the diversity null antenna are combined at the combining network with equal gain.

17. The system of claim 16 wherein said combining network is configured to combine the signals from the main null antenna and the diversity null antenna with phase alignment.

18. A repeater diversity method for a repeater having a main null antenna with a given phase center and polarization for receiving a communications signal from a remote signal source and a donor antenna for transmitting a signal to a base station, said method comprising:

providing a diversity null antenna having the same phase center as the main null antenna and a polarization orthogonal to the polarization of the main null antenna;

combining the signals from the main null antenna and the diversity null antenna to constitute diversity combined receive signals wherein said combining includes combining the signals from the main null antenna and the diversity null antenna with equal gain; and delivering the combined signals to said donor antenna.

19. The method of claim 18 wherein said combining includes combining the signals from the main null antenna and the diversity null antenna with phase alignment.

* * * * *